(12) United States Patent
Croteau et al.

(10) Patent No.: US 10,221,999 B2
(45) Date of Patent: Mar. 5, 2019

(54) PRESSURE VESSEL FLUID MANIFOLD ASSEMBLY

(71) Applicant: UNITED TECHNOLOGIES RESEARCH CENTER, East Hartford, CT (US)

(72) Inventors: Paul F. Croteau, Columbia, CT (US); Andrzej Ernest Kuczek, Bristol, CT (US); Daniel V. Viens, Mansfield Center, CT (US); Justin R. Hawkes, Marlborough, CT (US); Wenping Zhao, Glastonbury, CT (US); Thomas J. Garosshen, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 15/517,017

(22) PCT Filed: Oct. 7, 2014

(86) PCT No.: PCT/US2014/059402
§ 371 (c)(1),
(2) Date: Apr. 5, 2017

(87) PCT Pub. No.: WO2016/057023
PCT Pub. Date: Apr. 14, 2016

(65) Prior Publication Data
US 2017/0299122 A1    Oct. 19, 2017

(51) Int. Cl.
*F17C 13/00* (2006.01)
*F17C 1/14* (2006.01)
(Continued)

(52) U.S. Cl.
CPC .............. *F17C 13/002* (2013.01); *F17C 1/00* (2013.01); *F17C 1/14* (2013.01); *F17C 1/16* (2013.01);
(Continued)

(58) Field of Classification Search
CPC .... F17C 13/06; F17C 1/14; F17C 1/16; F17C 1/00; F17C 1/005; B65D 21/0205;
(Continued)

(56) References Cited

U.S. PATENT DOCUMENTS

| | | | | |
|---|---|---|---|---|
| 1,668,179 | A | * 5/1928 | Williams | ................ F17C 1/08 138/115 |
| 2,790,489 | A | * 4/1957 | Denison, Jr. | ........... F02K 9/605 137/266 |
| 3,012,695 | A | * 12/1961 | Lerner | ................. A45D 19/02 206/221 |
| 3,319,433 | A | * 5/1967 | Pauliukonis | ............. F17C 3/08 220/564 |
| 6,095,367 | A | 8/2000 | Blair et al. | |

(Continued)

FOREIGN PATENT DOCUMENTS

| | | |
|---|---|---|
| DE | 3026116 A1 | 2/1982 |
| EP | 1355105 A2 | 10/2003 |

(Continued)

OTHER PUBLICATIONS

Translation of FR2671542A1, Grisel, Jul. 17, 1992, p. 5.*
(Continued)

*Primary Examiner* — Robert J Hicks
(74) *Attorney, Agent, or Firm* — Cantor Colburn LLP

(57) ABSTRACT

A pressure vessel fluid manifold assembly includes a pressure vessel having a plurality of lobes joined to each other, each of the plurality of lobes having a wall disposed in
(Continued)

contact with an adjacent wall of an adjacent lobe, and wherein the manifold can be external or internal to the lobes.

4 Claims, 11 Drawing Sheets

(51) Int. Cl.
  *F17C 1/16* (2006.01)
  *F17C 1/00* (2006.01)
(52) U.S. Cl.
  CPC .............. *F17C 2201/0152* (2013.01); *F17C 2201/0166* (2013.01); *F17C 2201/0171* (2013.01); *F17C 2201/056* (2013.01); *F17C 2203/0617* (2013.01); *F17C 2203/0636* (2013.01); *F17C 2203/0643* (2013.01); *F17C 2203/0646* (2013.01); *F17C 2203/0663* (2013.01); *F17C 2205/0146* (2013.01); *F17C 2205/0305* (2013.01); *F17C 2209/2181* (2013.01); *F17C 2209/221* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/035* (2013.01); *F17C 2260/018* (2013.01); *F17C 2270/0168* (2013.01); *Y02E 60/321* (2013.01)
(58) Field of Classification Search
  CPC ............... B65D 21/0202; B65D 21/02; B65D 21/0208; F02M 37/0088; B60K 15/03006; B60K 15/03
  USPC .......... 220/582, 581, 23.83, 23.8, 23.2, 678, 220/501, 502, 567.2, 564, 563; 206/0.6; 141/170, 210, 35, 178, 202; 137/255, 137/263, 266, 265, 262, 259, 256
  See application file for complete search history.

(56) References Cited

U.S. PATENT DOCUMENTS

| | | | |
|---|---|---|---|
| 6,227,230 B1 * | 5/2001 | Huh | B60K 15/03006 137/255 |
| 2004/0226607 A1 * | 11/2004 | Hervio | F17C 1/02 137/259 |
| 2014/0166664 A1 | 6/2014 | Lin et al. | |
| 2017/0299119 A1 | 10/2017 | Zhao et al. | |
| 2017/0343160 A1 | 11/2017 | Garosshen et al. | |

FOREIGN PATENT DOCUMENTS

| | | | |
|---|---|---|---|
| EP | 1355107 A2 | 10/2003 | |
| EP | 1426673 A2 | 6/2004 | |
| EP | 2354700 A1 | 8/2011 | |
| FR | 2671542 A1 * | 7/1992 | ....... B60K 15/03177 |
| FR | 2739912 A1 | 4/1997 | |
| WO | 0066940 A1 | 11/2000 | |
| WO | 2015069376 A1 | 5/2015 | |
| WO | 2016057022 A1 | 4/2016 | |
| WO | 2016057024 A1 | 4/2016 | |

OTHER PUBLICATIONS

International Search Report and Written Opinion regarding related PCT Application No. PCT/US2014/059398; dated Jun. 23, 2015; 12 pgs.
International Search Report and Written Opinion regarding related PCT Application No. PCT/US2014/059402; dated Sep. 9, 2015; 15 pgs.
International Search Report and Written Opinion regarding related PCT Application No. PCT/US2014/059405; dated Jun. 23, 2015; 11 pgs.

* cited by examiner

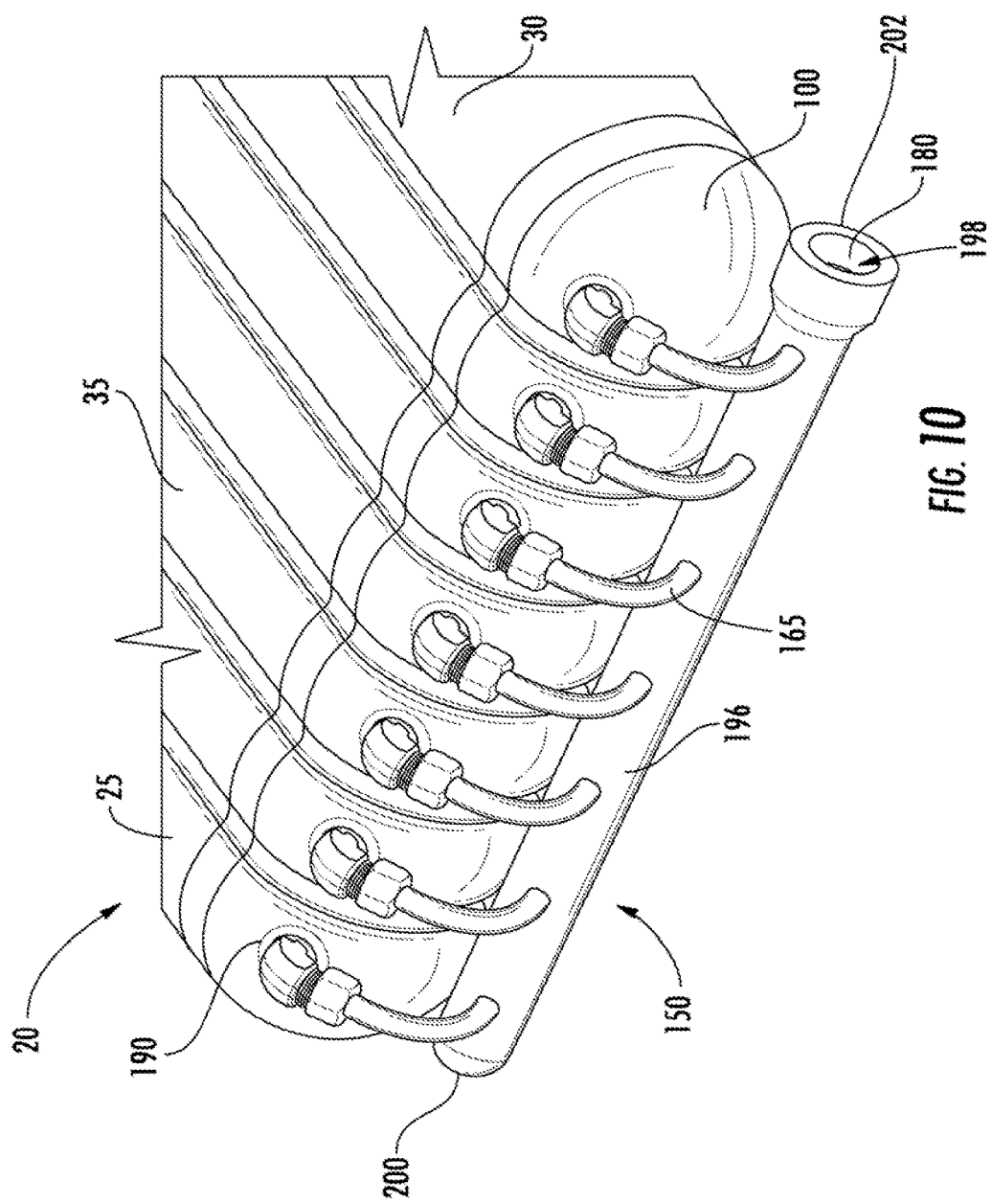

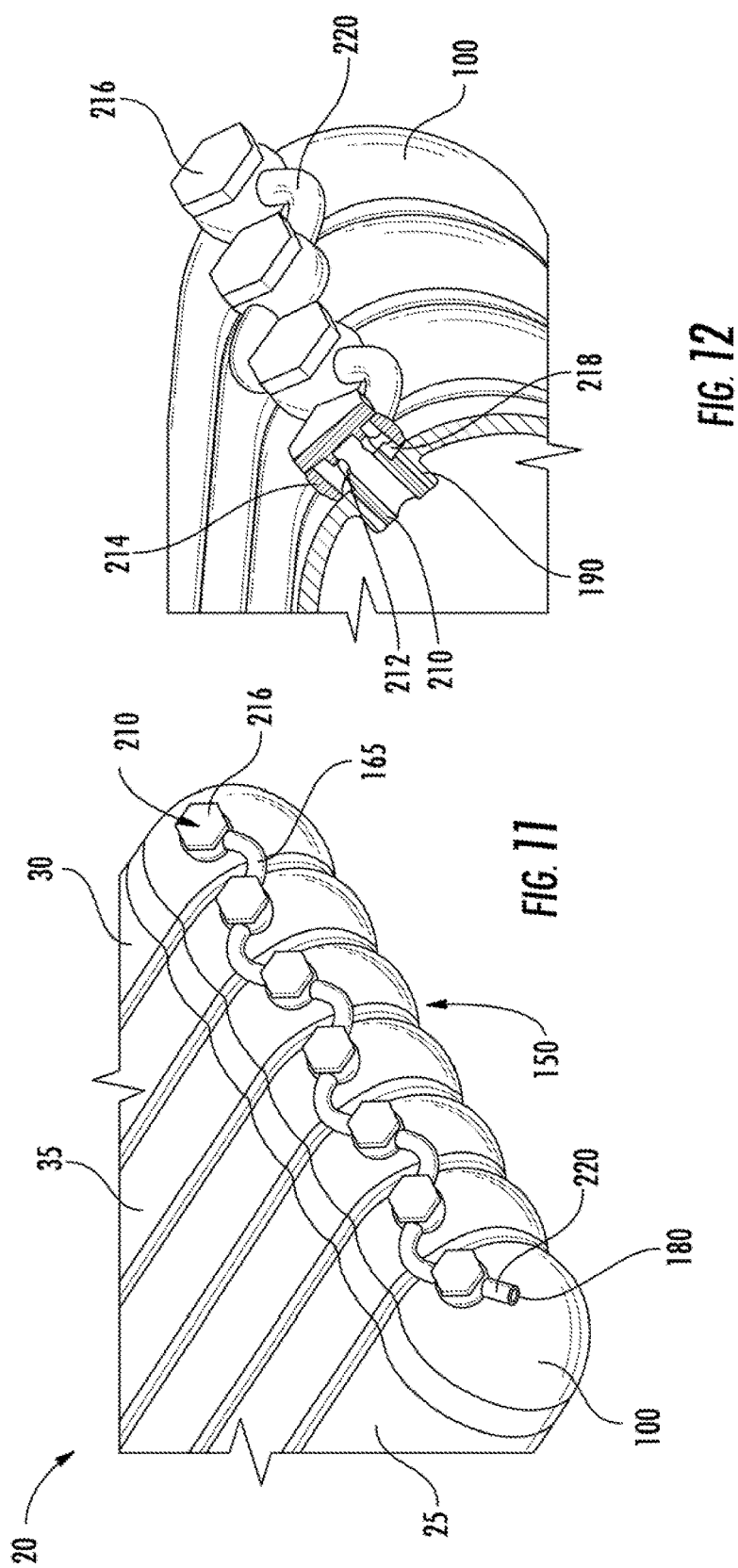

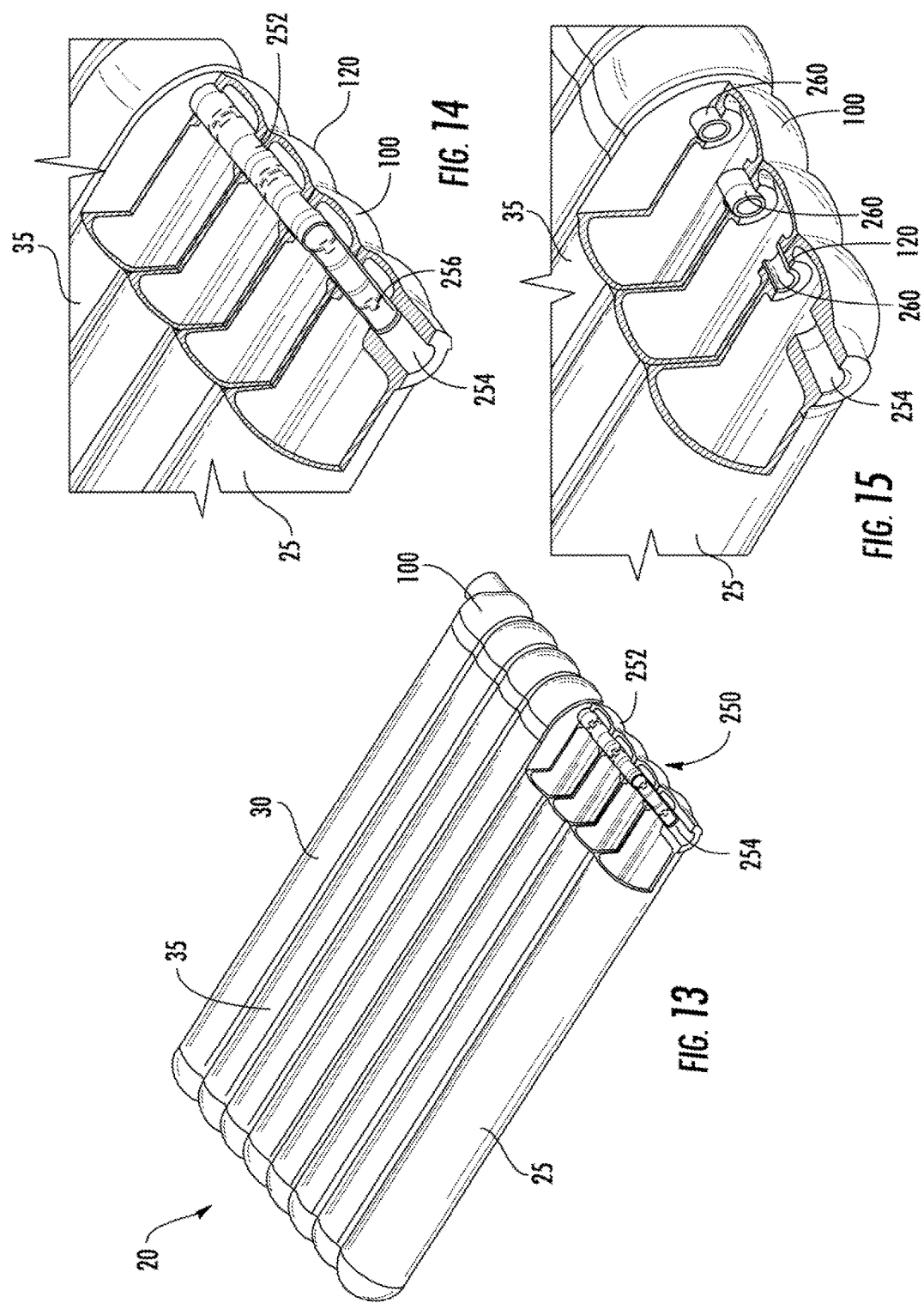

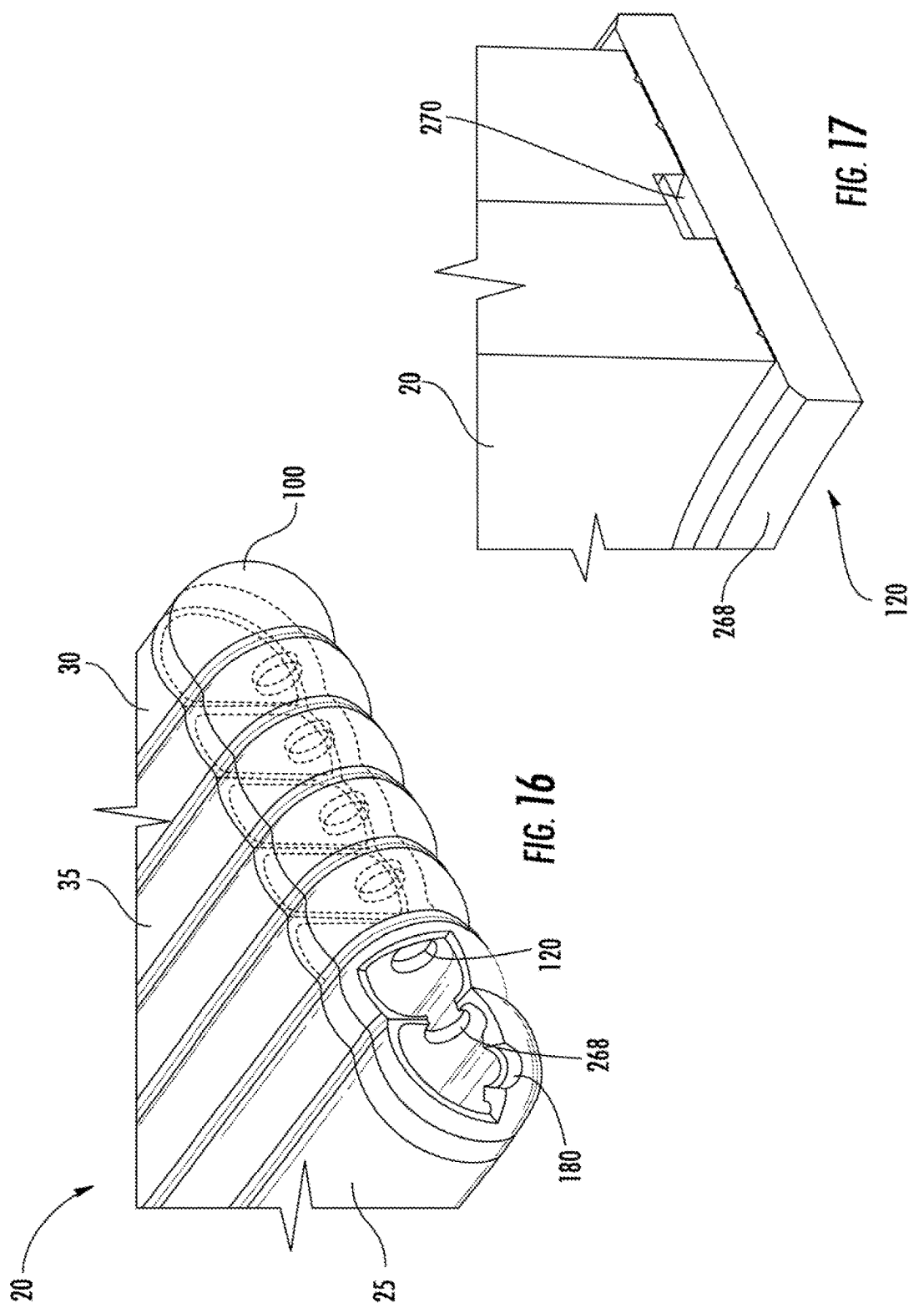

PRESSURE VESSEL FLUID MANIFOLD ASSEMBLY

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS-REFERENCE TO RELATED APPLICATION

This patent application claims the benefit of priority to International Patent Application Serial No. PCT/US2014/059402, filed Oct. 7, 2014, which is incorporated herein by reference in its entirety.

BACKGROUND OF THE INVENTION

Exemplary embodiments of the invention generally relate to pressure vessel to be used for transport, storage, or utilization of a pressurized fluid, and more particularly, to an optimized pressure vessel having a high rate of conformity.

Pressure vessels are widely used to store liquids and gases under pressure. The storage capacity of a pressure vessel depends on the internal volume of the pressure vessel and the pressure that the vessel is capable of safely containing. In addition to its storage capacity, the size, internal shape, external shape, and weight of the pressure vessel are customized for a particular application.

One growing application of pressure vessels is the storage of compressed natural gas (CNG). Relatively large multi-lobed tanks for the transport or storage of pressurized fluids exist. This basic technology may be extended to enable relatively inexpensive and commercially feasible fabrication of smaller tanks, which are capable of handling fluids under pressure. The current use of industry standard cylinders for CNG in automotive vehicles is limited because the gas volumetric density of a cylinder is low. A tank having enough natural gas to achieve a vehicle driving range comparable to conventional automobiles would be large and bulky and would require space that generally would be otherwise usable cargo space. The use of multiple tanks requires manifold assemblies that may be complex and susceptible to leaks. Complex external manifolds may require a large and wasted use of cargo space as well.

BRIEF DESCRIPTION OF THE INVENTION

According to one embodiment of the invention, a pressure vessel fluid manifold assembly includes a pressure vessel having a plurality of lobes joined to each other, each of the plurality of lobes having a wall disposed in contact with an adjacent wall of an adjacent lobe. Also included is a first end and a second end of each of the plurality of lobes. Further included is a plurality of end caps, each of the end caps mounted to the first end and the second end of the plurality of lobes. Yet further included is a fluid manifold fluidly coupling an interior region of each of the plurality of lobes, the fluid manifold having a fluid fill port.

In addition to one or more of the features described above, or as an alternative, further embodiments may include that the fluid manifold is an external manifold located at an exterior portion of the plurality of end caps.

In addition to one or more of the features described above, or as an alternative, further embodiments may include the external manifold includes a plurality of bosses extending from the end caps, the location of the plurality of bosses alternating between proximate a top side and proximate a bottom side of the end caps, the bosses each having an aperture extending therethrough and a hole fluidly coupling the aperture to the interior region of the lobes. The external manifold also includes a plurality of manifold tubes coupled to the bosses and fluidly coupled to the apertures of the bosses, wherein each of the manifold tubes is arranged in a substantially Z-shape.

In addition to one or more of the features described above, or as an alternative, further embodiments may include that the external manifold includes a plurality of bosses extending from the end caps, the location of the plurality of bosses alternating between proximate a top side and proximate a bottom side of the end caps, the bosses each having an aperture extending therethrough and a hole fluidly coupling the aperture to the interior region of the lobes. The external manifold also includes a plurality of manifold tubes coupled to the bosses and fluidly coupled to the apertures of the bosses, the plurality of manifold tubes comprising an end manifold tube extending between a boss on the top side and a boss on the bottom side, at least one top side manifold tube extending between bosses on the top side, and at least one bottom side manifold tube extending between bosses on the bottom side.

In addition to one or more of the features described above, or as an alternative, further embodiments may include that the external manifold includes a top side circular boss and a bottom side circular boss extending from each of the plurality of end caps, the bosses each penetrating into the interior region of the lobes and defining a hole. The external manifold also includes a plurality of manifold tubes coupled to the bosses, each of the manifold tubes coupled to, and extending between, a top side circular boss of an end cap and a bottom side circular boss of an adjacent end cap.

In addition to one or more of the features described above, or as an alternative, further embodiments may include that the top side circular boss and the bottom side circular boss each extend from the end cap at an angle of 45 degrees relative to a horizontal plane of the pressure vessel.

In addition to one or more of the features described above, or as an alternative, further embodiments may include that the external manifold includes a header having an interior cavity extending between a closed end and an open end, the open end comprising the fill port, the header extending horizontally along the pressure vessel. The external manifold also includes a plurality of apertures spaced along the longitudinal direction of the header. The external manifold further includes a plurality of bosses extending from each of the plurality of end caps, the bosses each penetrating into the interior region of the lobes and defining a hole. The external manifold yet further includes a plurality of manifold tubes extending between, and fluidly coupling, the bosses and the apertures of the header.

In addition to one or more of the features described above, or as an alternative, further embodiments may include that the external manifold includes a plurality of apertures defined by the end caps. The external manifold also includes a plurality of annular rings having at least one hole, each of the annular rings disposed in contact with one of the end caps proximate the respective aperture of the end cap. The external manifold further includes a plurality of hollow bolts threaded to the end caps within the plurality of apertures for clamping the annular rings to the end caps, the bolt and the annular ring defining an annular passage and each bolt having at least one relief hole to fluidly couple the interior region of the lobes to the annular passage. The external manifold yet further includes a plurality of tubes coupled to, and extending between, the annular rings to fluidly couple adjacent annular passages.

In addition to one or more of the features described above, or as an alternative, further embodiments may include that the fluid manifold comprises an internal manifold assembly disposed within the interior region of the plurality of lobes.

In addition to one or more of the features described above, or as an alternative, further embodiments may include a plurality of openings defined by the wall and the adjacent wall of each of the plurality of lobes, wherein the internal manifold comprises a single tube extending through the wall and the adjacent wall of each of the plurality of lobes, the single tube having an inner wall surface defining a fluid passage configured to fluidly couple the interior region of each of the plurality of lobes.

In addition to one or more of the features described above, or as an alternative, further embodiments may include a plurality of hole sections defined by and extending through the single tube, each of the plurality of hole sections located within distinct lobes.

In addition to one or more of the features described above, or as an alternative, further embodiments may include the plurality of hole sections comprise holes having a geometry of at least one of elliptical and circular.

In addition to one or more of the features described above, or as an alternative, further embodiments may include a plurality of openings defined by the wall and the adjacent wall of each of the plurality of lobes to fluidly couple the interior region of each of the plurality of lobes. Also included is a plurality of sealing components disposed in the plurality of openings.

In addition to one or more of the features described above, or as an alternative, further embodiments may include the plurality of sealing components are threaded to the wall and the adjacent wall of each of the plurality of lobes, the sealing components configured to couple the adjacent lobes to each other and to seal the plurality of openings.

In addition to one or more of the features described above, or as an alternative, further embodiments may include the plurality of sealing components are expansion rings formed of a shape memory alloy.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 10 is a perspective view of another embodiment of an external fluid manifold of the pressure vessel:

FIG. 11 is a perspective view of another embodiment of an external fluid manifold of the pressure vessel:

FIG. 12 is a partial cross-sectional view of the external manifold according to the embodiment of FIG. 11;

FIG. 13 is a perspective, partial cut-away view of an embodiment of an internal fluid manifold of the pressure vessel;

FIG. 14 is an enlarged view of the internal fluid manifold according to the embodiment of FIG. 13;

FIG. 15 is a perspective, partial cut-away view of another embodiment of an internal fluid manifold of the pressure vessel;

FIG. 16 is a perspective view of another embodiment of an internal fluid manifold of the pressure vessel; and FIG. 17 is an enlarged view of the internal fluid manifold according to the embodiment of FIG. 16.

The detailed description explains embodiments of the invention, together with advantages and features, by way of example with reference to the drawings.

DETAILED DESCRIPTION OF THE INVENTION

Figure 1:
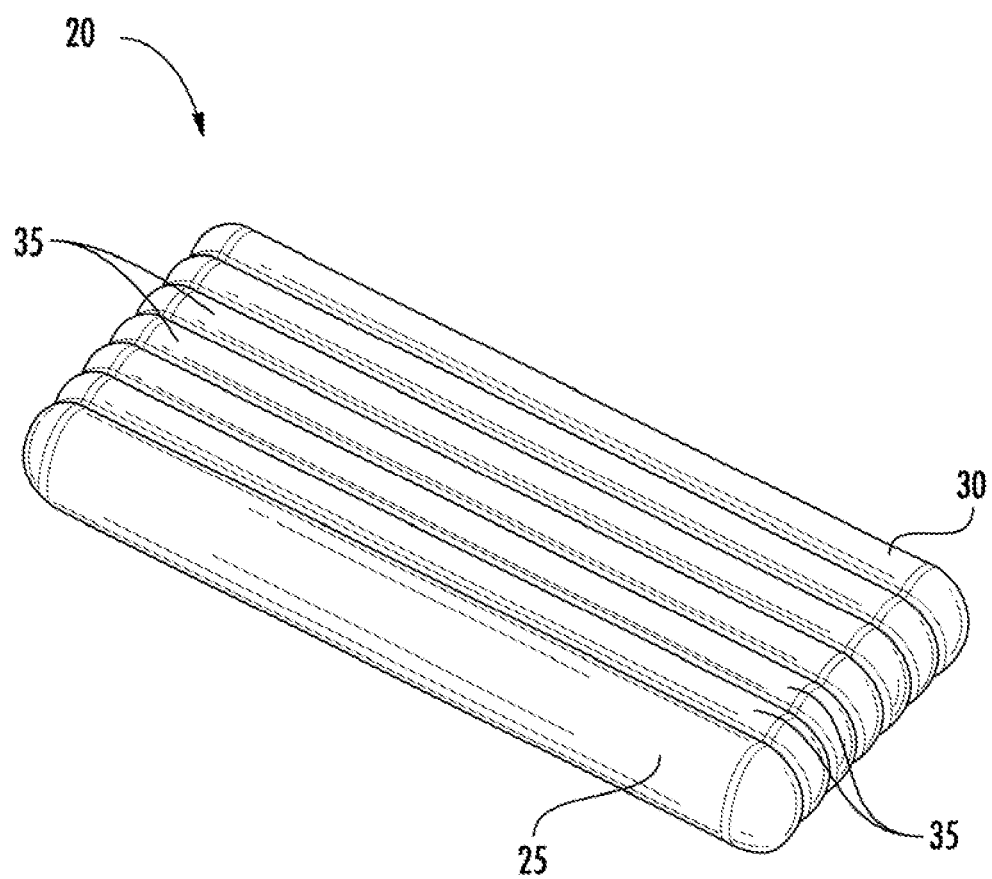
FIG. 1 is a perspective view of a pressure vessel configured to store a pressurized fluid according to an embodiment of the invention.

Referring now to FIG. 1, an example of a pressure vessel or tank 20 configured to store a high pressure fluid or gas is illustrated. Exemplary fluids or gases that may be stored within the pressure vessel 20 include, but are not limited to, compressed natural gas (CNG), hydrogen, propane, methane, air, and hydraulic fluid, for example. The pressure vessel 20 includes a plurality of generally cylindrical lobes including a left end lobe 25 and a right end lobe 30. In the illustrated, non-limiting embodiment, the pressure vessel 20 additionally includes a plurality of substantially identical interior lobes 35, such as five interior lobes 35 for example; however a pressure vessel 20 having any number of interior lobes 35 is within the scope of the invention. The left end lobe 25, one or more interior lobes 35, and the right end lobe 30 are positioned side by side and are joined together by a plurality of bonds (see FIG. 3). As a result of this arrangement, the overall configuration of the pressure vessel 20 is generally rectangular in shape.

Figure 2:
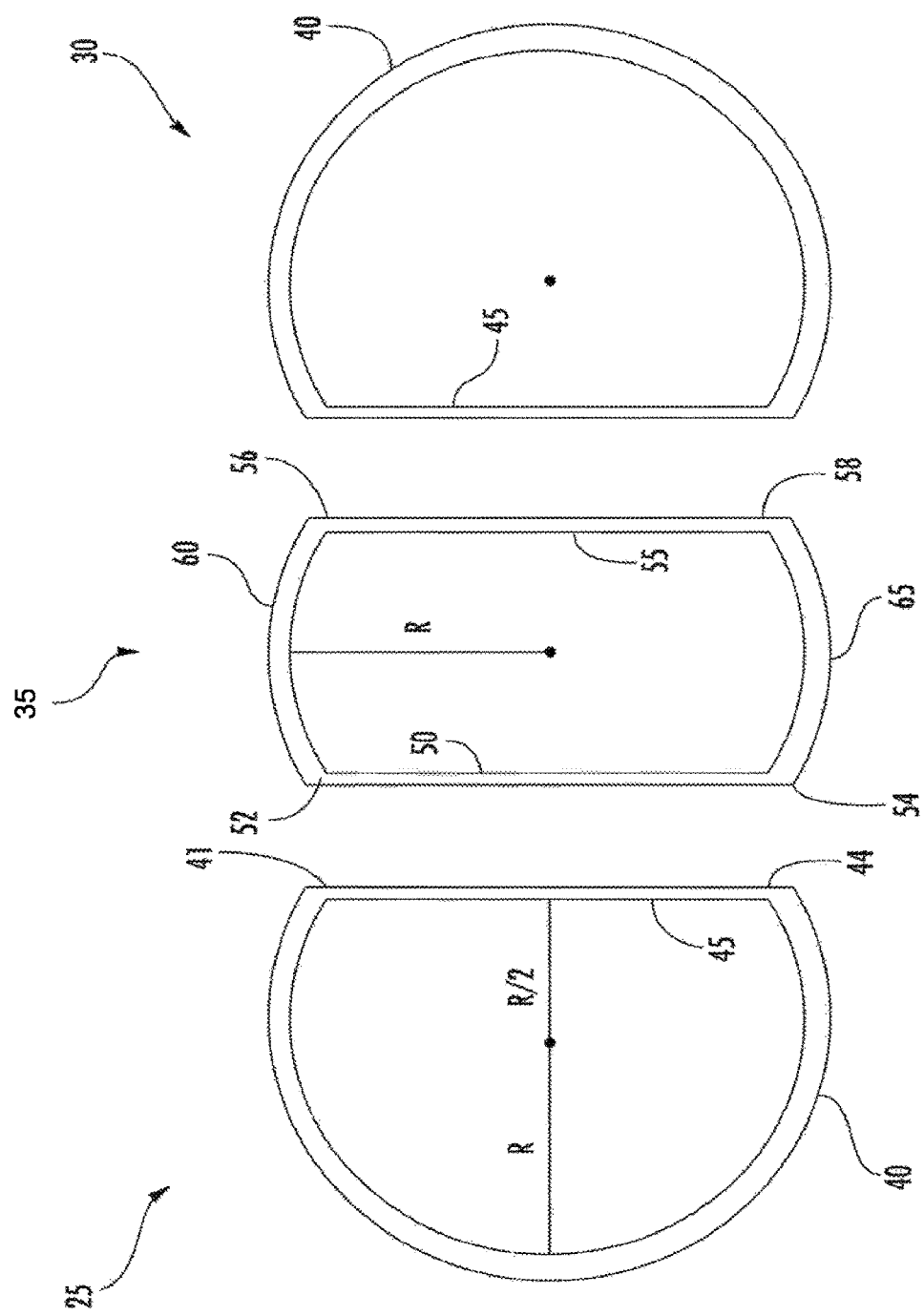
FIG. 2 is a disassembled end view of a portion of an embodiment of the pressure vessel.

Referring now to FIG. 2, the individual lobes 25, 30, 35 of the pressure vessel 20 are provided in more detail. The left end lobe 25 and the right end lobe 30 are substantially identical and are arranged such that the right end lobe 30 is rotated 180 degrees relative to the left end lobe 25, or are arranged as a mirror image of one another. The end lobes 25, 30 include a generally cylindrical outer wall 40 having a first thickness. An interior wall 45 extends generally vertically between a first end 41 and a second end 44 of the cylindrical outer wall 40 and has a thickness equal to half that of the outer wall 40. In one embodiment, the interior wall 45 is integrally formed with the ends 41, 44 of the cylindrical outer wall 40. At least a portion of the curvature of the cylindrical outer wall 40 is defined by a radius R. In one embodiment, the portion of the outer wall 40, opposite the interior wall 45, includes a circular shape or curve generally of a 240 degree angle as defined by the radius R. Consequently, the overall height of the end lobes 25, 30 is equal to double the length of the radius R of the cylindrical outer wall 40. The vertical interior wall 45 is generally parallel to and spaced apart from a vertical plane P that includes the origin of the radius R that defines the curvature of the outer wall 40. In one embodiment, the distance between the interior wall 45 and the parallel vertical plane P is about half the length of the radius R. As a result, the end lobes 25, 30 generally have a width equal to about one and a half the length of the radius of curvature R of the outer wall 40.

The illustrated interior lobe 35 includes a vertically arranged first interior sidewall 50 and second interior sidewall 55, separated from one another by a distance. In one embodiment, the width of the interior lobe 35 is generally equal to the radius of curvature R of the end lobes 25, 30. The thicknesses of the first interior sidewall 50 and the second interior sidewall 55 are identical and equal to the thickness of the interior wall 45 of the end lobes 25, 30. A first outside wall 60 extends between a first end 52 of the first interior sidewall 50 and a first end 56 of the second interior sidewall 55. Similarly, a second outside wall 65 extends between a second end 54 of the first interior sidewall 50 and a second end 58 of the second interior sidewall 55. The thickness of the first and second outside walls 60, 65 is substantially identical to the thickness of the curved outer wall 40 of the end lobes 25, 30. In one embodiment, the plurality of interior walls 50, 55 and the plurality of outside walls 60, 65 are integrally formed.

The curvature of the first outside wall 60 and the second outside wall 65 may be defined by a circular shape or curve generally of a 60 degree angle by a radius R. In one embodiment, the radius of curvature R of the interior lobe 35 is substantially identical to the radius of curvature R of the end lobes 25, 30. Consequently, the distance between the first curved wall 60 and the second curved wall 65 is double the length of the radius of curvature R, and is therefore, substantially equal to the height of the end lobes 25, 30.

When the pressure vessel 20 is assembled, each interior wall 45, 50, 55 is positioned directly adjacent another interior wall 45, 50, 55. For example, in a pressure vessel 20 not having any interior lobes 35, the interior wall 45 of the left end lobe 25 is arranged next to the interior wall 45 of the right end lobe 30. In a pressure vessel 20 having a single interior lobe 35, the first interior sidewall 50 abuts the interior wall 45 of the left end lobe 25 and the second interior sidewall 55 abuts the interior wall 45 of the right end lobe 30. In embodiments including a plurality of interior lobes 35, the second interior sidewall 55 of at least one of the interior lobes 35 is arranged next to a first interior sidewall 50 of an adjacent interior lobe 35. The distance between the origin of the radius of curvature R of an interior lobe and the origin of the radius of curvature R an adjacent lobe, either an end lobe 25, 30 or another interior lobe 35, is generally equal to the length of the radius of curvature R. In addition, the overall width of the pressure vessel 20 is generally equal to the sum of three and the total number of interior lobes 35 multiplied by the length of the radius of curvature R.

Figure 3:
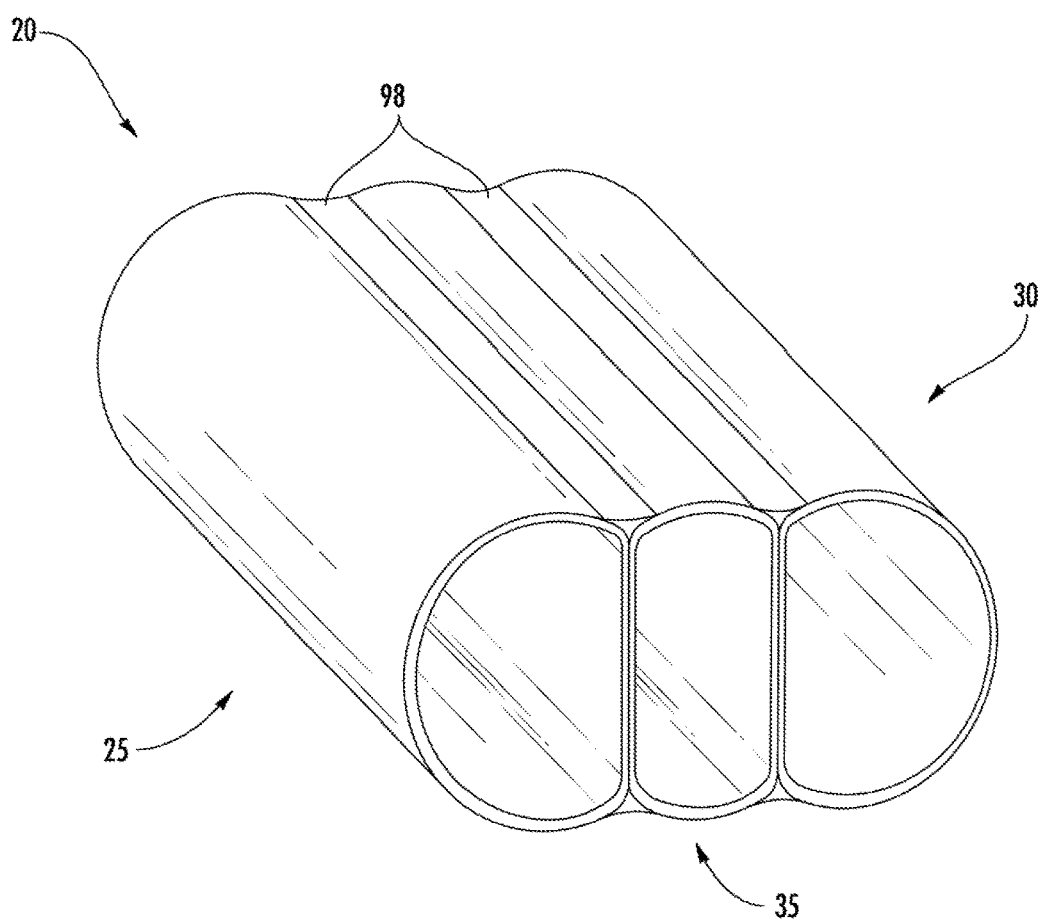
FIG. 3 is a perspective view of a portion of an embodiment of the pressure vessel.

As illustrated in FIG. 3, adjacent lobes 25, 30, 35 of the pressure vessel 20 are coupled with one or more bonds 98. The bonds 98 are configured to transmit the tensile load on the curved walls 40, 60, 65 between the plurality of lobes 25, 30, 35. The bonds 98 are sized to provide adequate strength and load path to allow a balanced load share between outer walls 40, 60, 65 with vertical interior walls 45, 50 and 55. Exemplary processes for fabricating these bonds 98 include, but are not limited to, fusion welding, such as arc laser or electron beam welding, solid state welding, such as friction stir welding, linear friction welding, brazing, and transient liquid phase bonding for example, depending on the selected tank material.

Figure 4:
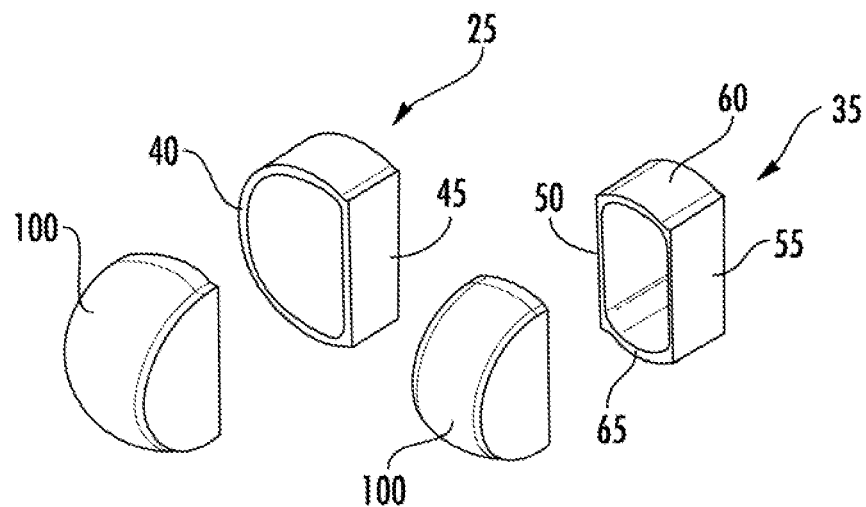
FIG. 4 is a disassembled perspective view of an end region of the pressure vessel.
Figure 5:
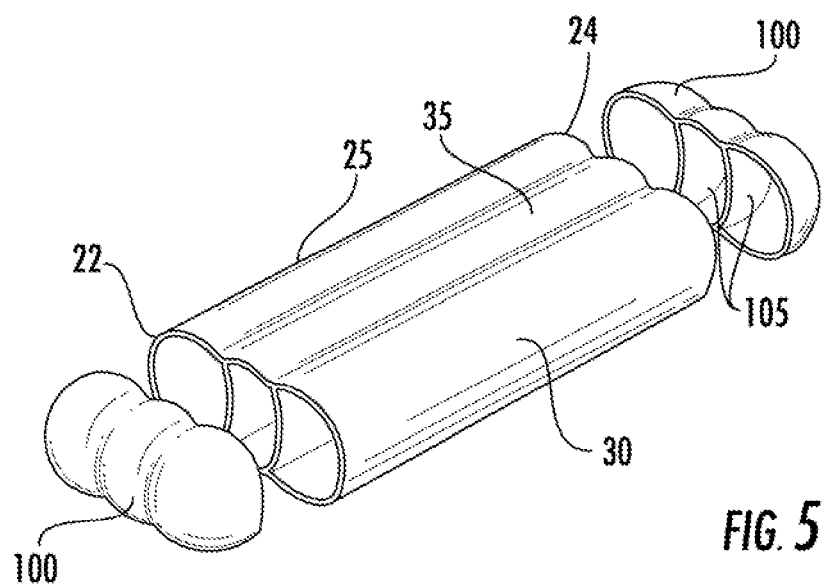
FIG. 5 is a disassembled perspective view of a pressure vessel.

Referring now to FIGS. 4 and 5, an end cap 100 is mounted, such as with a flash butt weld for example, at both a first end 22 and a second, opposite end 24 of each of the plurality of lobes 25, 30, 35 of the pressure vessel 20. The plurality of end caps 100 mounted to an end 22, 24 of each of the lobes 25, 30 35, may be separate (FIG. 4) or may be integrally formed (FIG. 5). In embodiments where the end caps 100 are integrally formed, the end caps 100) include an internal support 105 generally aligned with each adjacent interior wall 45, 50, 55 of the pressure vessel 20. Each end cap 100 has a shape substantially complementary to the shape of the adjacent lobe 25, 30, 35 of the pressure vessel 20. In one embodiment, each end cap 100 includes a portion of a sphere having a radius equal to the radius of curvature R. As a result, the end caps 100 configured to couple to the end lobes 25, 30 include a greater portion of a sphere than the end cap(s) 100 configured to couple to the interior lobes 35.

The lobes 25, 30, 35 of the pressure vessel 20 generally may be fabricated from a high strength metal or composite material. The end lobes 25, 30 and the interior lobes 35 may be formed by any of a number of manufacturing processes, including, but not limited to, extrusion, forging, squeeze casting, roll forming, and laser forming for example. End caps 100 may be fabricated similarly from a high strength metal or composite material, and by a process including but not limited to, stamping, forging, squeeze casting, impact extrusion, and machining for example. An embodiment of tank 20 may be fabricated from a composite by a process including, but not limited to, weaving, braiding, filament winding, ply layups for example. These processes may be used individually or in combination to fabricate individual or conjoined tubes to produce the final geometry.

Referring now to FIGS. 6-12, the plurality of lobes 25, 30, 35 may be fluidly coupled via an external manifold 150. Multiple embodiments of the external manifold 150 are contemplated and described below in detail.

Figure 6:
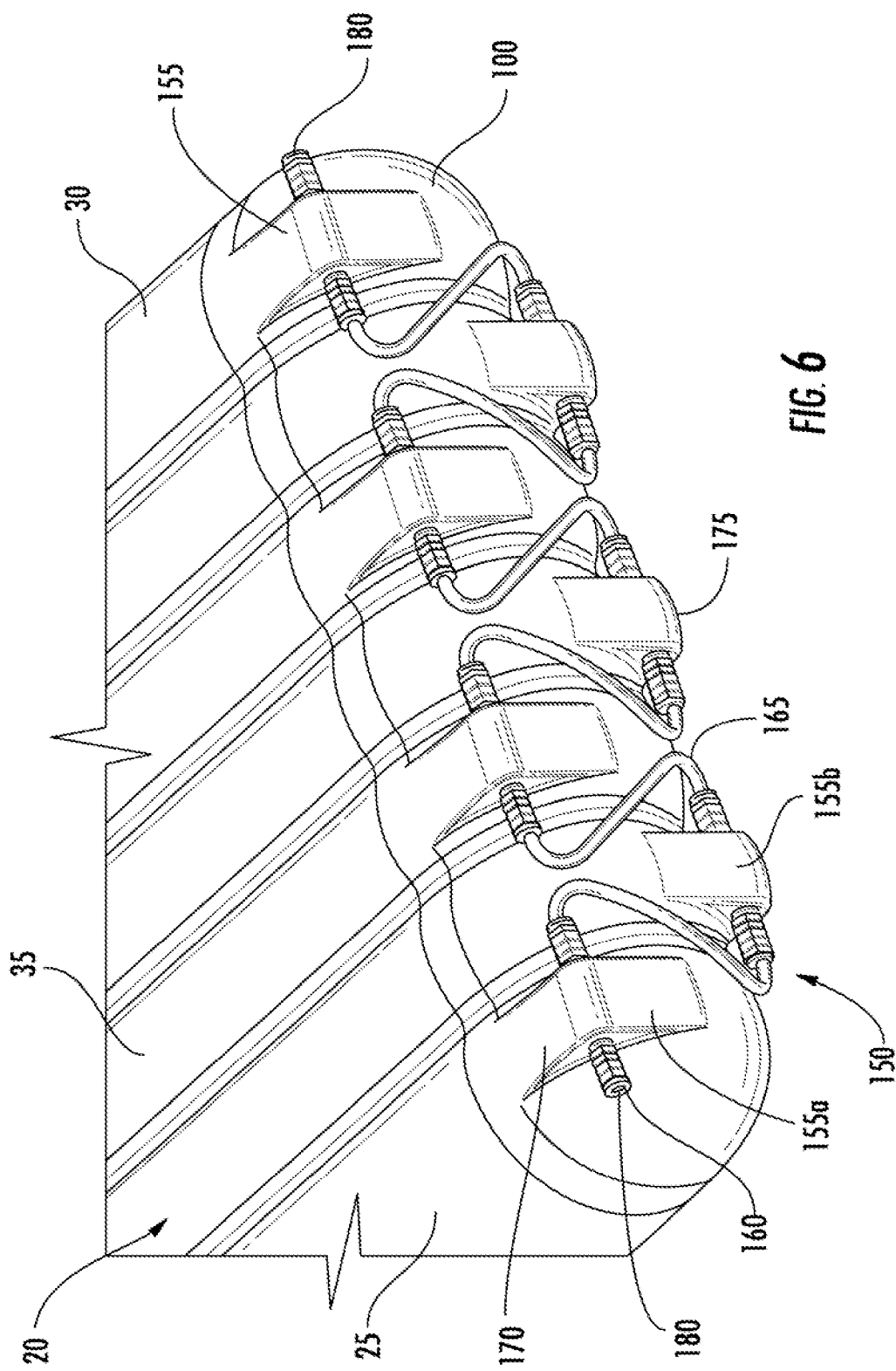
FIG. 6 is a perspective view of an embodiment of an external fluid manifold of the pressure vessel.

Referring to FIG. 6, an external boss 155 is formed on the exterior of the end cap 100, adjacent each lobe 25, 30, 35 of the pressure vessel 20. Each external boss 155 includes an aperture extending through the external boss 155 and arranged substantially parallel to the horizontal plane H and a hole extending substantially perpendicularly from the aperture into the interior of pressure vessel 20. A connector 160, fluidly coupled to the external boss 155 proximate the aperture, and therefore to the interior of the pressure vessel 20, is mounted to both sides of each boss 155. A piece of tubing 165, otherwise referred to herein as a manifold tube, extends from a connector 160 of a first external boss 155a to a connector 160 of a second external boss 155b. In one embodiment, the position of the external boss 155 on an end cap 100, relative to each lobe 25, 30, 35, may alternate such that the tubing 165 extending between adjacent connectors 160 is arranged in a Z-shape. More specifically, the bosses 155 alternate such that one boss 155a is disposed proximate a top side 170 of the end cap 100 and an adjacent boss 155b is disposed proximate a bottom side 175 of the end cap 100. As shown, this alternating arrangement results in the above-described Z-shape of the tubing 165 to provide strain relief of potential growth of the pressure vessel 20 due to pressurization of the pressure vessel 20 and/or exposure to temperature extremes relative to ambient. One of these connectors 160 may be fluidly coupled to engine or to a system for refilling the pressurized fluid (not shown) stored therein, thereby providing a fluid fill port 180. In one embodiment, there is a single fluid fill port, while other embodiments include multiple fluid fill ports. Additionally, the external manifold 150 may be used to fluidly couple a plurality of stacked pressure vessels 20.

Figure 7:
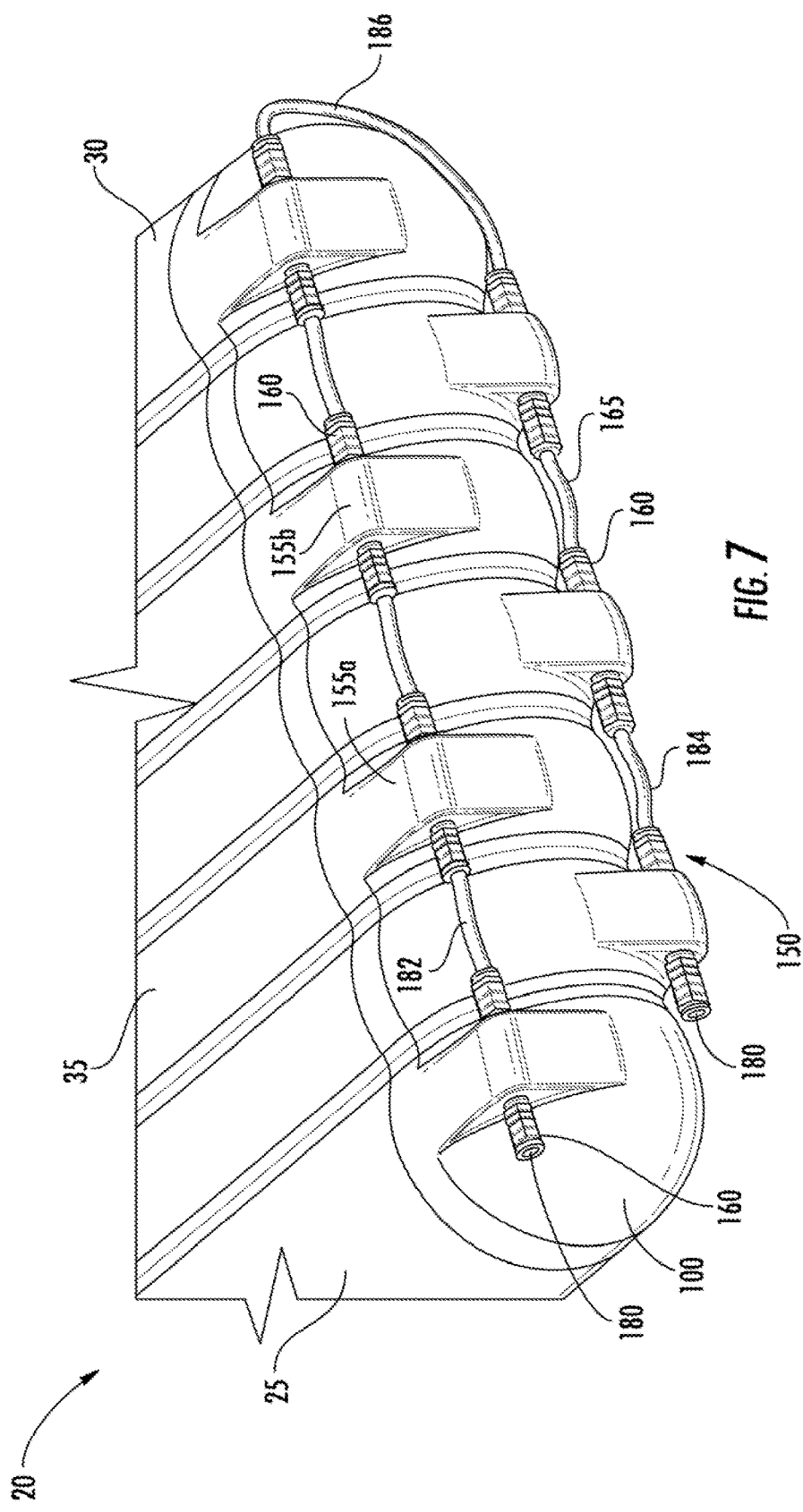
FIG. 7 is a perspective view of another embodiment of an external fluid manifold of the pressure vessel.

Referring to FIG. 7, the alternating boss arrangement of the embodiment of FIG. 6 is included. The embodiment illustrated in FIG. 7 provides a distinct tubing arrangement to connect the different lobes of the pressure vessel 20. As shown, the tubing 165 extends from a connector 160) of a first external boss 155a to a connector 160 of a second external boss 155b. In one embodiment, one or more top side manifold tubes 182 is included to couple bosses located proximate the top side 170 of the end caps 100, while one or more bottom side manifold tubes 184 is included to couple bosses located proximate the bottom side 175 of the end caps 100. Furthermore, an end manifold tube 186 extends between a boss on the top side 170 and a boss on the bottom side 175.

In one embodiment, the top side manifold tube(s) 182 and the bottom side manifold tubes 184 include slight curvature that is concentric with the end cap curvature. However, it is contemplated that straight tubes may be employed. The connectors 160 that are located at the ends of the arrangement, and which are not connected to a tube, may be connected to a valve assembly and employed as fluid fill ports.

Figure 9:
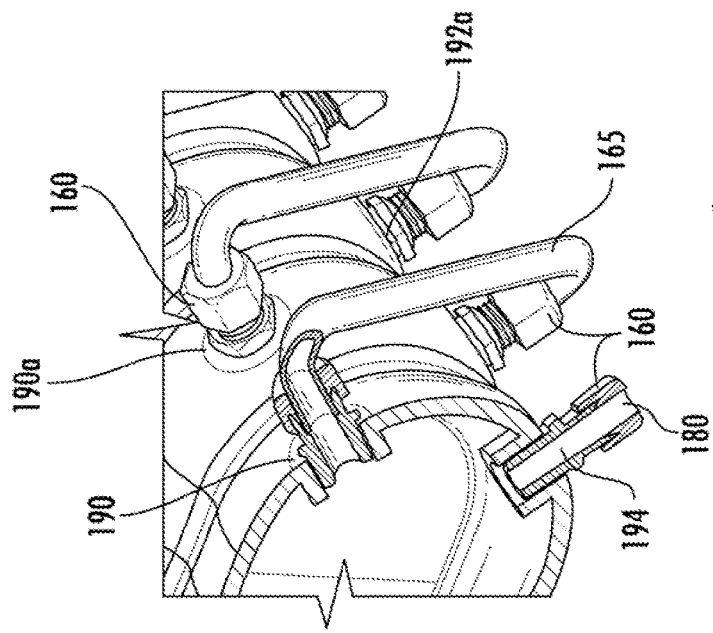
FIG. 9 is a partial cross-sectional view of the external manifold according to the embodiment of FIG. 8.
Figure 8:
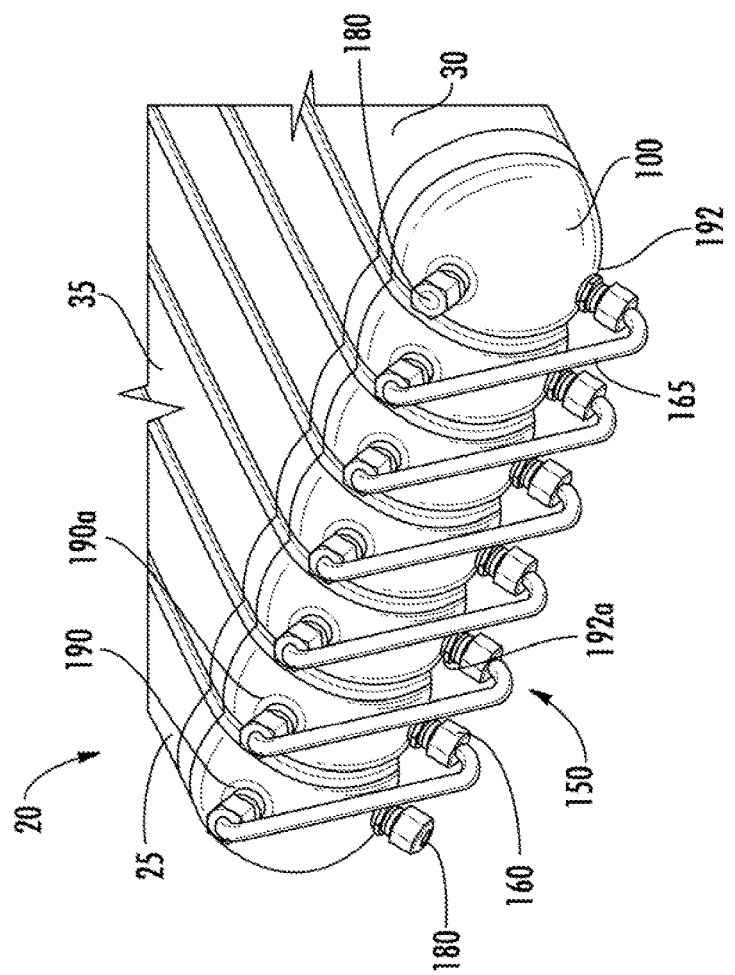
FIG. 8 is a perspective view of another embodiment of an external fluid manifold of the pressure vessel.

Referring to FIGS. 8 and 9, another embodiment of the external manifold 150 is illustrated. Included are top side circular bosses 190 and bottom side circular bosses 192 formed on or within the end caps 100. The circular bosses 190, 192 are oriented about respective axes that are each oriented normal to the surface of the end caps 100. In one embodiment, the bosses 190, 192 are each oriented at an angle of about 45 degrees relative to the horizontal plane H of the pressure vessel 20. Irrespective of the precise orientation of the bosses 190, 192, the bosses each penetrate into the interior region of the lobes of the pressure vessel 20 and define a hole 194. A connector 160 is mounted to each of the bosses 190, 192. In the illustrated embodiment, the manifold tubes 165 are coupled to the bosses 190, 192, with the connectors 160 and extend from a top circular boss 190a to an adjacent bottom circular boss 192a, thereby fluidly coupling the interior regions of the lobes. The connectors 160 that are located at the ends of the arrangement, and which are not connected to a tube, may be connected to a valve assembly and employed as fluid fill ports.

Referring to FIG. 10, another embodiment of the external manifold 150 is illustrated. The external manifold 150 includes the top side bosses 190 similar to the embodiment of FIGS. 8 and 9. Included is a header 196 extending substantially horizontally and having an interior cavity 198 extending between a closed end 200 and an open end 202. The manifold tubes 165 are coupled to the bosses 190 in the manner described above, but are coupled to the header 196 proximate a plurality of apertures 204 spaced along the longitudinal direction of the header 196. The open end 202 of the header 196 may be connected to a valve assembly and employed as a fluid fill port.

Referring now to FIGS. 11 and 12, another embodiment of the external manifold 150 is illustrated. The external manifold 150 includes the top side bosses 190 similar to the embodiment of FIGS. 8-10. A bolt 210, such as a banjo bolt is threaded into the bosses 190 to penetrate the end caps 100 to the interior region of the lobes. The bolt 210 is hollow and includes at least one relief hole 212. Surrounding a portion of the bolt 210 is an annular ring 214 that is clamped to the end cap 100 with a head portion 216 of the bolt 210. An annular passage 218 is defined by the bolt 210 and the annular ring 214. The hollow portion and the relief hole(s) 212 of the bolt 210 fluidly couple the interior region of the lobes to the annular passage 218. Each of the manifold tubes 165 are coupled to, and extend between, adjacent annular rings 214 to fluidly couple the annular passages 218. As shown, the tubes 165 may be non-linear, such that a curved or bent pattern is established. A tube segment 220 may be included at an end of the arrangement to be connected to a valve assembly and is employed as a fluid fill port.

Referring now to FIGS. 13-17, the plurality of lobes 25, 30, 35 may be fluidly coupled via an internal manifold 250. Multiple embodiments of the internal manifold 250 are contemplated and described below in detail. The internal manifold 250 fluidly couples the interior regions of the lobes while eliminating the need for external tube connectors, tubes and other associated features, thereby reducing weight and leak risk.

Referring to FIGS. 13 and 14, the pressure vessel 20, may include a plurality of openings 120 such that the pressurized fluid arranged therein may communicate between the plurality of lobes 25, 30, 35. Each of the plurality of openings 120 is generally aligned and may be formed in either an interior wall 40, 50, 55 of a lobe, or in the sidewall or internal support 105 of each end cap 100. In one embodiment, a sealing element having a length greater than double the thickness of the interior wall 45, 50, 55 is arranged within each opening 120 to prevent the pressurized fluid from leaking between the adjacent interior walls 45, 50 55. Exemplary sealing elements include, but are not limited to, a metal O-ring, an e-seal, and a seal formed from a shrink metal alloy for example.

Extending between the distinct interior regions of the lobes is a single tube 252 that extends through the openings 120. The tube 252 is inserted through an access port 254 located on the side of the end cap 100 and is swaged, or plastically deformed from the inside of the tube 252 outwardly to create a sealing interference fit at each junction of adjacent walls. The inner diameter of each opening 120 may include machined features including, but not limited to, knife edge concentric ridges to enhance connection and sealing with the tube 252.

The tube 252 includes a plurality of hole sections 256 defined by, and extending through, the tube 252. Each of the hole sections 256 are located within distinct lobes to fluidly couple the tube 252 to the interior region of each lobe. The holes may be formed in any suitable geometry, including circular or elliptical to reduce axial stiffness when compared to a solid wall tube. An end of the tube 252 located proximate the access port 254 may be used as the fluid fill port.

Referring to FIG. 15, a similar arrangement to the embodiment of FIGS. 13 and 14 is provided. However, rather than a single tube, a plurality of sealing components 260) is provided. The plurality of sealing components 260 includes distinct seal segments located within each of the openings 120. The sealing components 260 may be installed prior to joining the lobe segments. The sealing components 260 may be press fitted in one embodiment. In another embodiment, the sealing components 260 are threaded to the openings of the adjacent walls. In particular, a double-threaded arrangement may be employed. Specifically, about half of the outer diameter of the sealing component 260 may include a right-handed thread and the other half of the outer diameter includes a left-handed thread. The inner surface of the sealing component 260 includes a geometry (e.g., square, hexagon, etc.) that facilitates the transmittal of torque from an operator or a machine. The sealing components 260 are seated within a seal, as described above.

When the lobes are brought together with the sealing component 260, a seal is created at each junction of adjoining walls. The adjacent walls of lobes are not typically in constant and complete contact along an entire length thereof due to the joining methods occurring proximate the top and bottom sides of the pressure vessel 20. Drawing the walls together with the sealing components 260 enhances the contact between the walls, thereby reducing the voids. Such a sealing arrangement is desirable to prevent an equalization of pressure between the storage cavities of the lobes and the void between the walls. Such equalization causes a high stress state at the root of the joined material (e.g., welds).

Referring to FIGS. 16 and 17, another embodiment of the internal manifold 250 is illustrated. In the illustrated embodiment, the openings 120 are sealed with a cylindrical coupler 268 that is fabricated from a shape memory alloy that expands or contracts with controlled temperature excursions. Depending on the particular alloying of the material, the coupler 268 could be made to contract with a rise to a certain elevated temperature and then contract with a decrease to a certain low temperature. The temperature extremes would need to be above and below the operating range of the pressure vessel 20 to prevent unintended activation of the shape memory alloy. The coupler 268 would be exposed to an elevated temperature to cause its contraction and then installed in the openings 120 of adjacent walls. The outer surface of the coupler 268 may have sealing enhancing features, such as knife-edge concentric ridges 270. After the lobes are brought together with all the couplers in place (located and retained by a locating feature that prevents axial movement), the assembly would then be exposed to the low extreme temperature to cause the couplers to expand and then create the sealing joint with the openings 120.

All of the embodiments of the internal manifold 250 provide a fluid fill port 180 configured to connect the pressure vessel 20 to an engine or to a system for refilling the pressurized fluid (not shown) stored therein.

The pressure vessel 20 has a significantly higher conformability (ratio of volume of pressurized fluid that can be stored within the pressure vessel to the equivalent rectangular envelope) than conventional pressure vessels for storing a pressurized fluid. The high conformability of the pressure vessel 20 is a result of the geometry, which has been optimized to share the loads and minimize the stresses, such as hoop stress for example, on the interior and outer walls 40, 45, 50, 55, 60, 65 of the conjoined lobes 25, 30, 35 under internal pressure Additionally, the embodiments of the external and internal manifolds 150, 250 provide fluid routing schemes that do not require much, if any, external volume and fluidly couple the different lobes of the pressure vessel 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pressure vessel fluid manifold assembly comprising:
a pressure vessel having a plurality of lobes joined to each other, each of the plurality of lobes having a wall disposed in contact with an adjacent wall of an adjacent lobe;
a first end and a second end of each of the plurality of lobes;
a plurality of end caps, each of the end caps mounted to the first end and the second end of the plurality of lobes;
a fluid manifold fluidly coupling an interior region of each of the plurality of lobes, the fluid manifold having a fluid fill port, the fluid manifold comprising an internal manifold assembly disposed within the interior region of the plurality of lobes; and
a plurality of openings defined by the wall and the adjacent wall of each of the plurality of lobes, wherein the internal manifold comprises a single cylindrical tube extending through the wall and the adjacent wall of each of the plurality of lobes, the single cylindrical tube having an inner wall surface defining a fluid passage configured to fluidly couple the interior region of each of the plurality of lobes.

2. The pressure vessel manifold assembly of claim 1, further comprising a plurality of hole sections defined by and extending through the single tube, each of the plurality of hole sections located within distinct lobes.

3. The pressure vessel manifold assembly of claim 2, wherein the plurality of hole sections comprise holes having a geometry of at least one of elliptical and circular.

4. The pressure vessel manifold assembly of claim 1, further comprising:
a plurality of sealing components disposed in the plurality of openings.

* * * * *